(12) United States Patent
Handke

(10) Patent No.: US 6,881,004 B2
(45) Date of Patent: Apr. 19, 2005

(54) KNUCKLE BRACKET FOR A STRUT-TYPE SHOCK ABSORBER

(75) Inventor: Günther Handke, Euerbach (DE)

(73) Assignee: ZF Sachs AG, Schweinfurt (DE)

( * ) Notice: Subject to any disclaimer, the term of this patent is extended or adjusted under 35 U.S.C. 154(b) by 24 days.

(21) Appl. No.: 10/104,715

(22) Filed: Mar. 22, 2002

(65) Prior Publication Data

US 2002/0141817 A1 Oct. 3, 2002

(30) Foreign Application Priority Data

Mar. 28, 2001 (DE) .......................................... 101 15 373

(51) Int. Cl.⁷ ............................ B25G 3/36; B60G 15/00
(52) U.S. Cl. ............... 403/384; 188/322.19; 248/230.1; 280/124.1
(58) Field of Search .......................... 403/24, 230, 231, 403/234, 274, 282, 337, 344, 405.1; 280/661, 668, 96.1, 901; 248/230.1, 300, 230.2, 562, 230.6, 631

(56) References Cited

U.S. PATENT DOCUMENTS

| | | | | |
|---|---|---|---|---|
| 499,568 A | * | 6/1893 | Nowotny et al. | ........... 431/295 |
| 1,444,249 A | * | 2/1923 | Kenneth | ..................... 248/411 |
| 3,350,750 A | * | 11/1967 | Scarr et al. | ................. 403/211 |
| 3,917,308 A | * | 11/1975 | Schulz | .................. 280/86.753 |
| 4,321,988 A | * | 3/1982 | Bich | ..................... 188/321.11 |
| 4,365,909 A | * | 12/1982 | Stephan | ....................... 403/157 |
| 4,484,670 A | | 11/1984 | Axthammer et al. | ... 18/322.191 |
| 4,491,339 A | | 1/1985 | Mizumukai et al. | ........ 280/668 |
| 4,699,233 A | * | 10/1987 | Koga et al. | .................. 180/219 |
| 4,948,160 A | * | 8/1990 | Barry | ..................... 280/86.753 |
| 5,170,973 A | * | 12/1992 | Ohta | ......................... 248/230.2 |
| 5,180,129 A | | 1/1993 | Yamaoka et al. | ........... 248/230 |
| 5,308,032 A | * | 5/1994 | Ohta | ........................ 248/230.2 |
| 5,423,403 A | | 6/1995 | Handke et al. | ......... 188/322.11 |
| 5,730,547 A | * | 3/1998 | Nogami | ...................... 403/384 |
| 5,772,168 A | | 6/1998 | Nakazawa et al. | |
| 6,367,751 B1 | * | 4/2002 | Perrott | ..................... 248/218.4 |

FOREIGN PATENT DOCUMENTS

| | | | | |
|---|---|---|---|---|
| DE | 196 47 411 | | 3/1998 | ........... B60G/12/00 |
| JP | 04060230 A | * | 2/1992 | |
| JP | 11148529 A | * | 6/1999 | |
| JP | 2000-154842 A2 | * | 6/2000 | |
| WO | WO 99/27175 A | * | 6/1999 | ............. F16F/9/54 |

OTHER PUBLICATIONS

Patent Abstracts of Japan, vol. 017, No. 151 (M–1387), Mar. 23, 1993 & JP 04 321807 A (Tokico Ltd.), Nov. 11, 1992.
Patent Abstracts of Japan, 03–037441 A, Feb. 1991.
Patent Abstracts of Japan, 11–257 411 A, Sep. 1999.

\* cited by examiner

*Primary Examiner*—Robert J. Sandy
(74) *Attorney, Agent, or Firm*—Cohen, Pontani, Lieberman & Pavane

(57) ABSTRACT

One-piece knuckle bracket made as a bent-to-shape part, comprising two support bodies a certain distance apart, each with an opening for receiving the external casing of a strut-type shock absorber. A connecting web and tabs for attachment of the shock absorber to a joint are provided between the support bodies, and the connecting web between the separated support bodies and the tabs for the attachment to a joint are connected to each other in such a way as to form an overall U-shape.

15 Claims, 8 Drawing Sheets

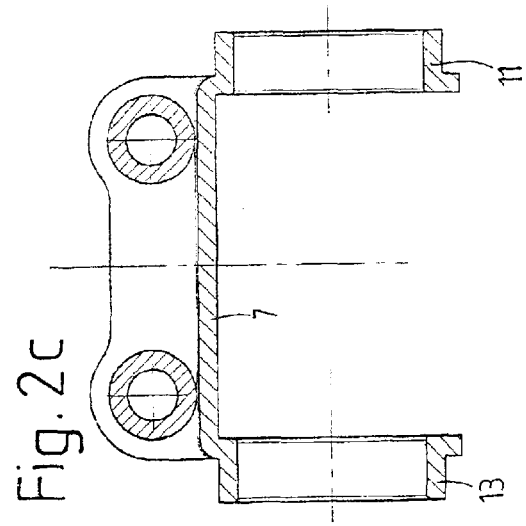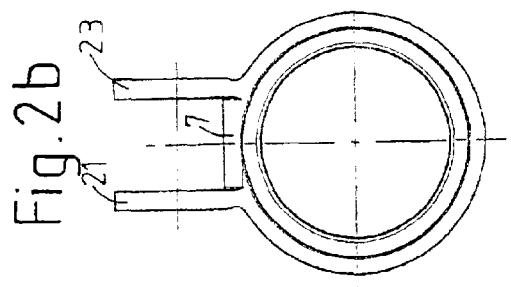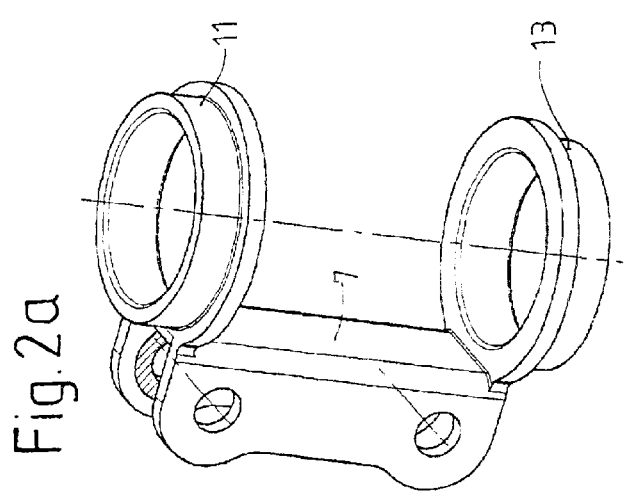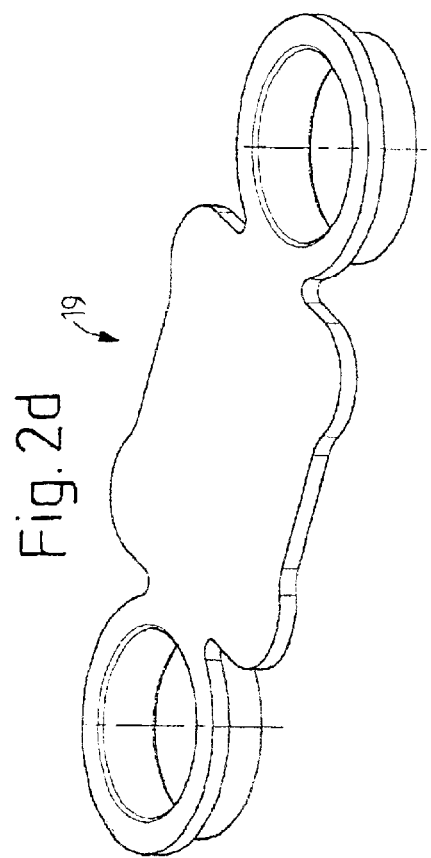

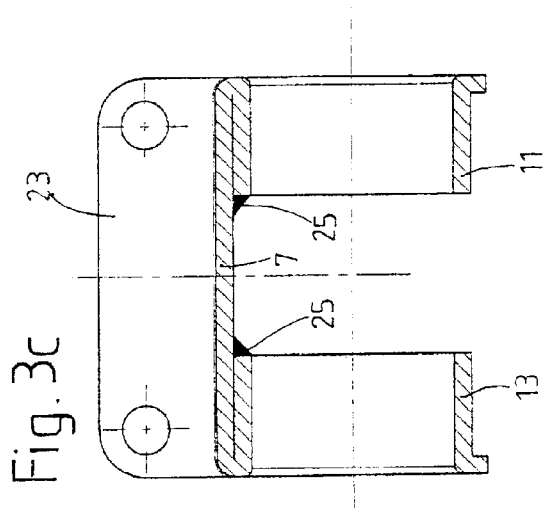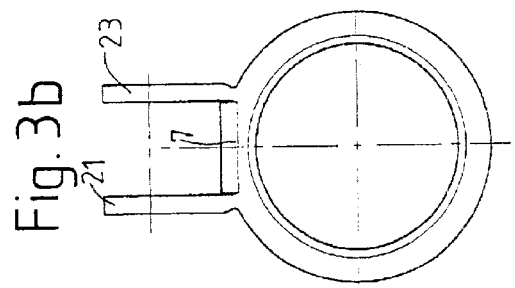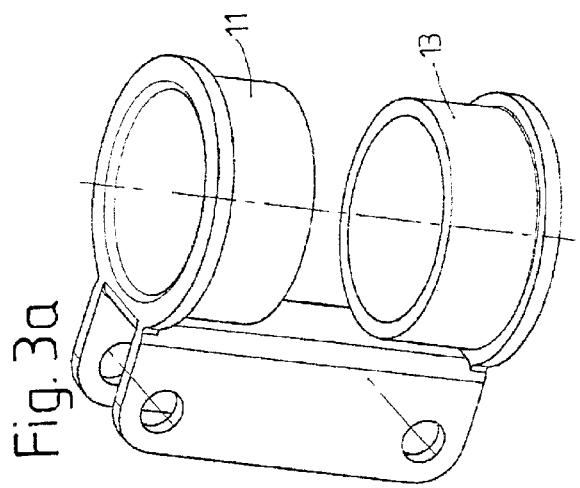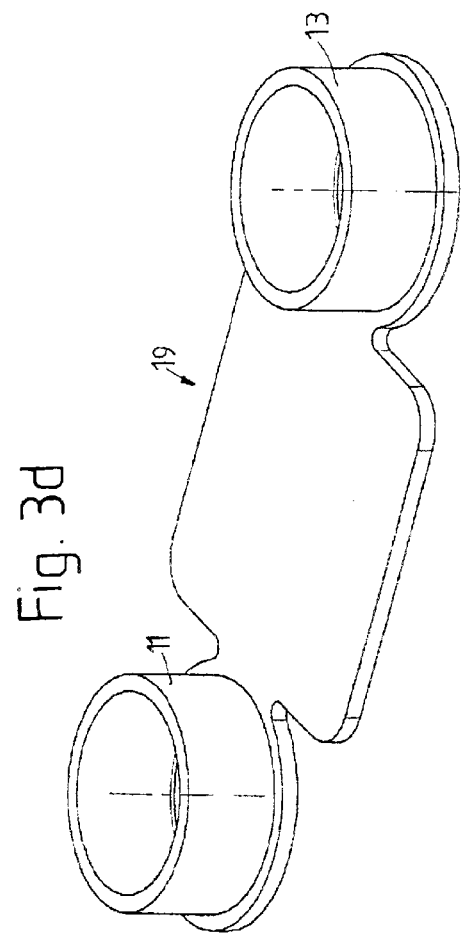

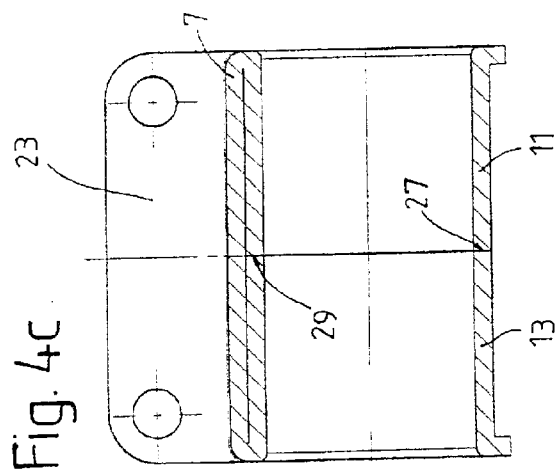
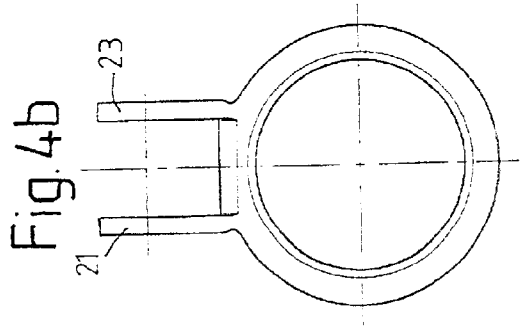
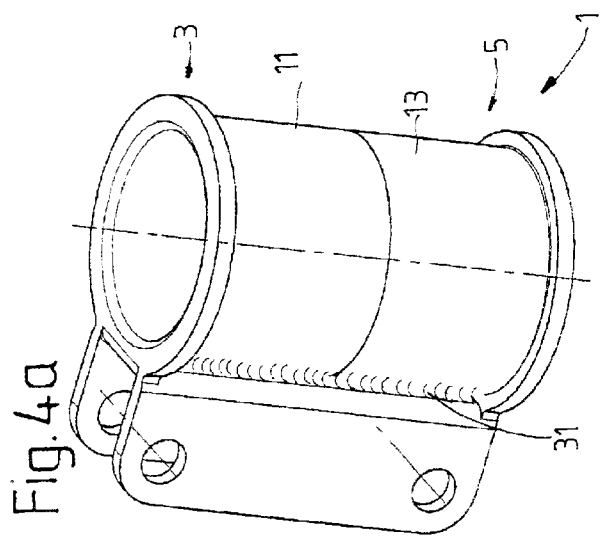
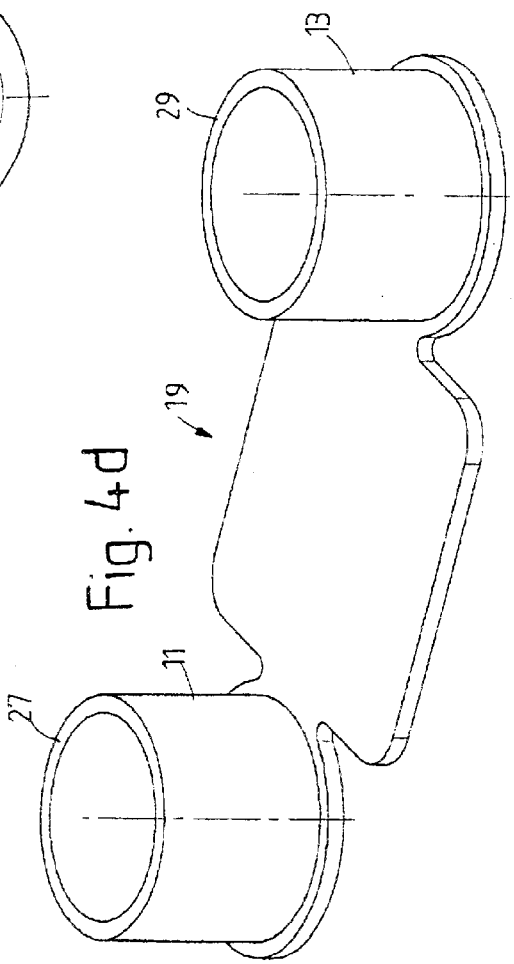

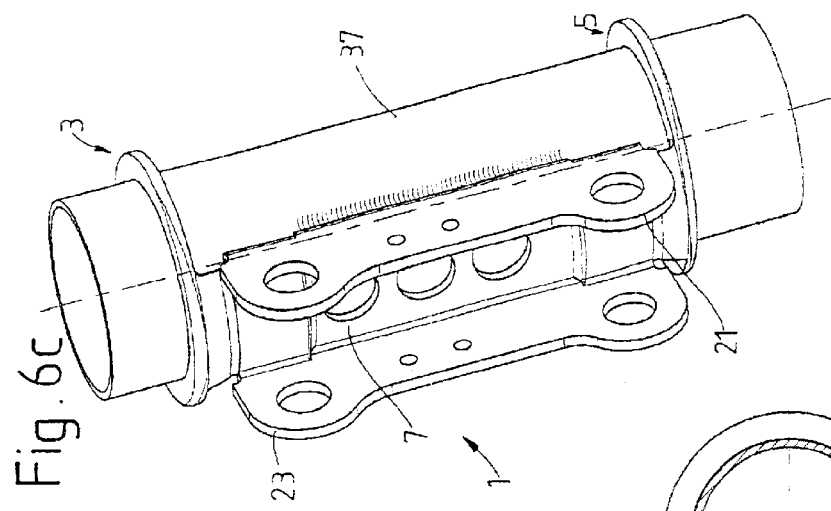
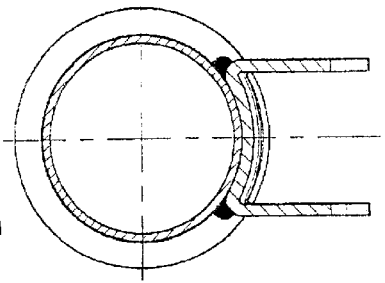
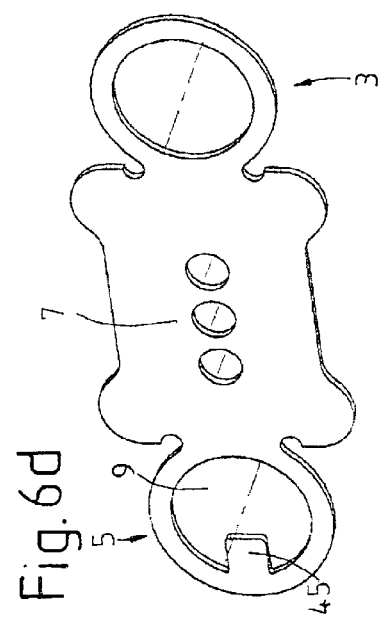
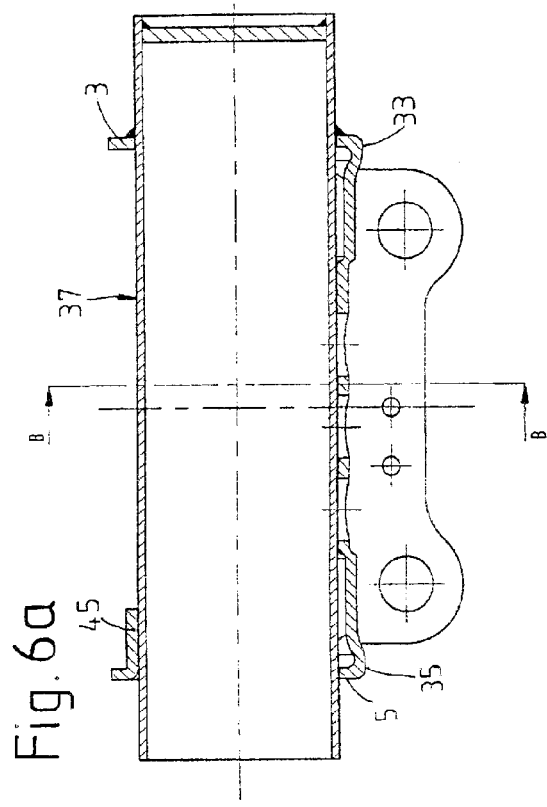

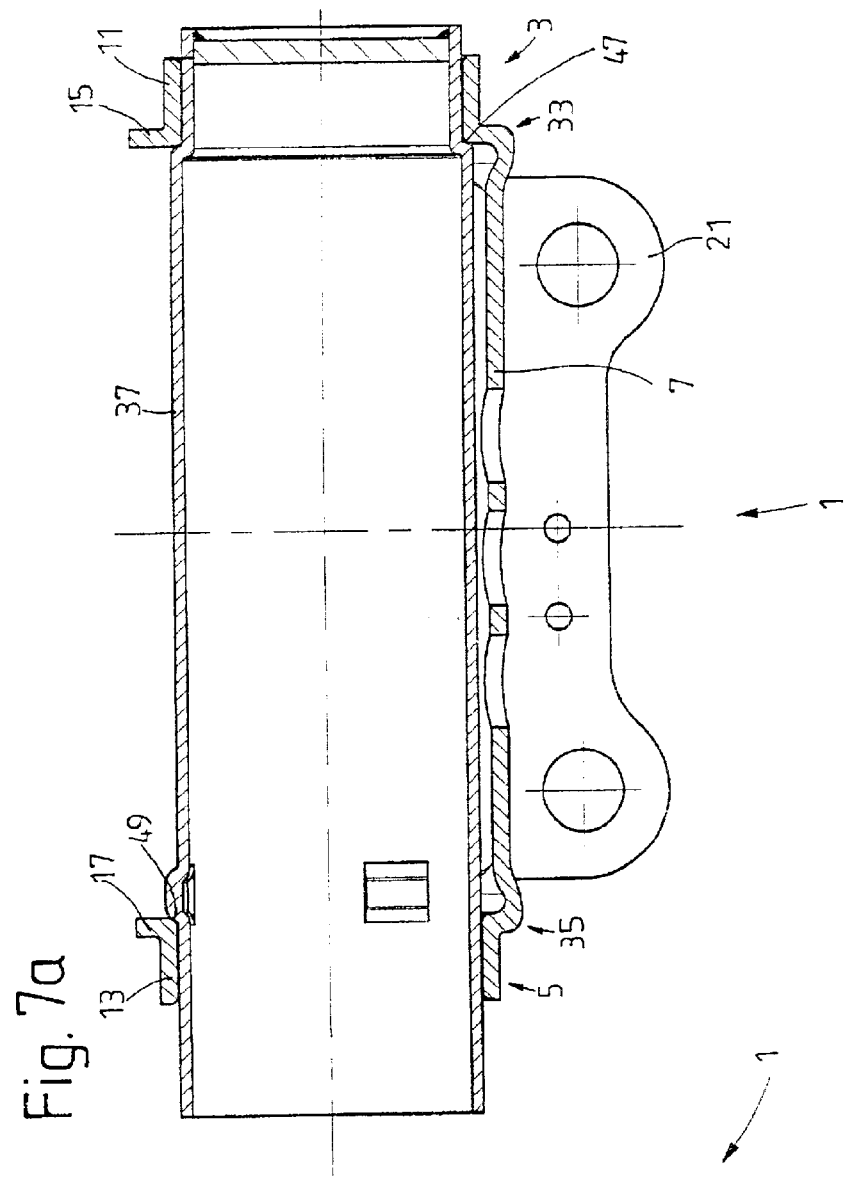
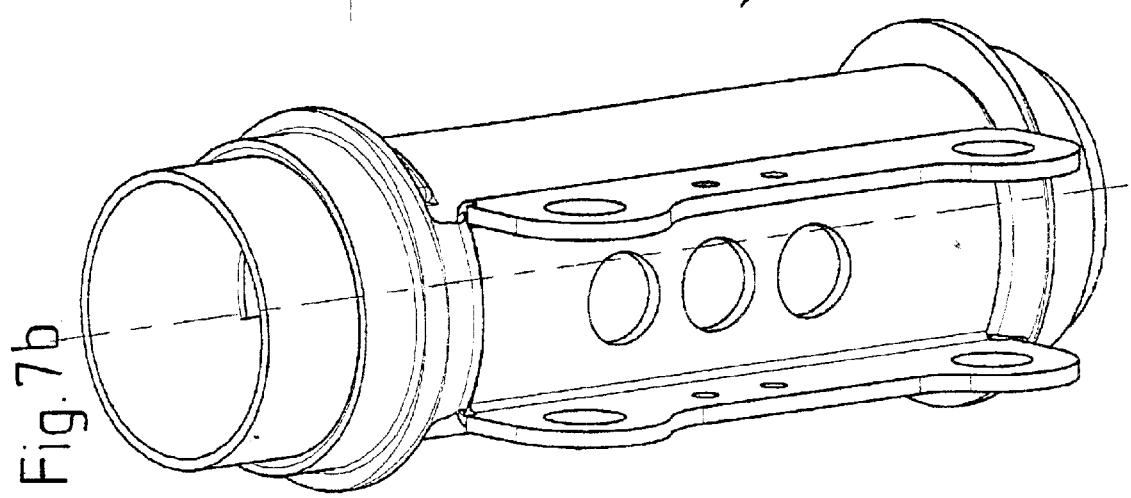

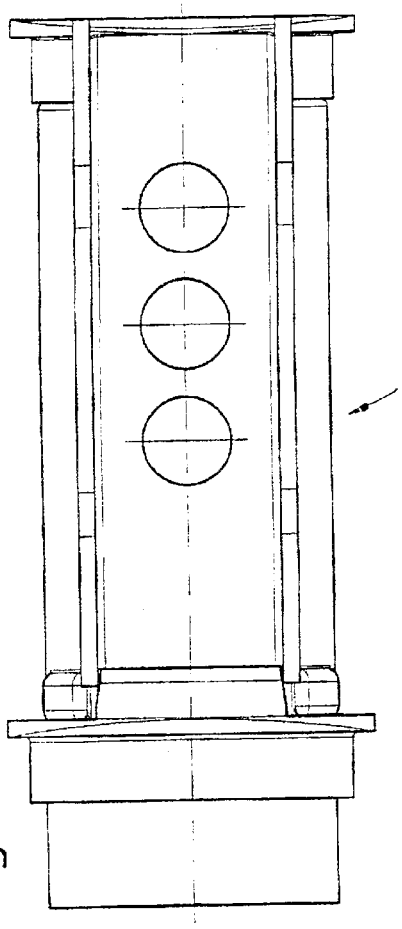
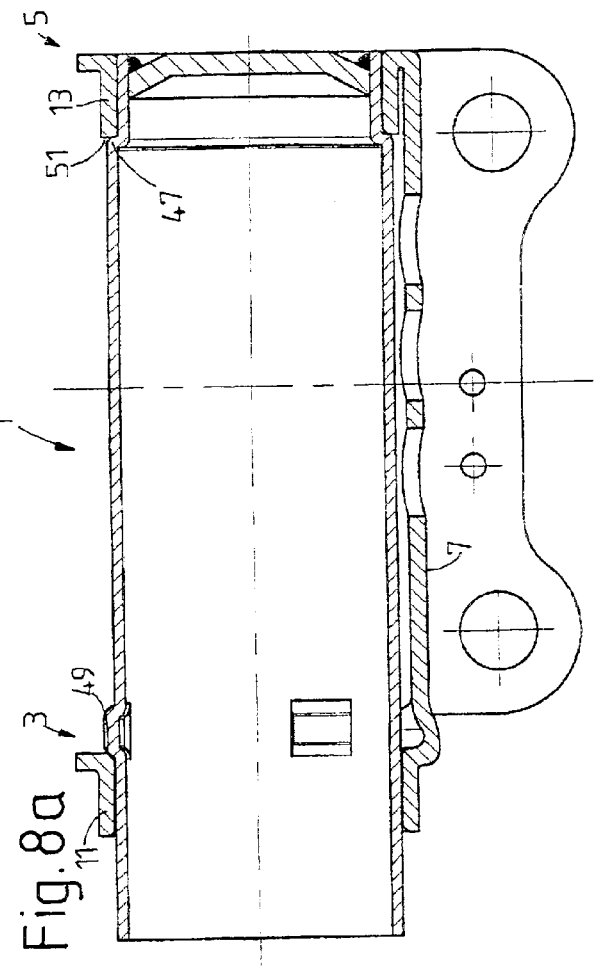
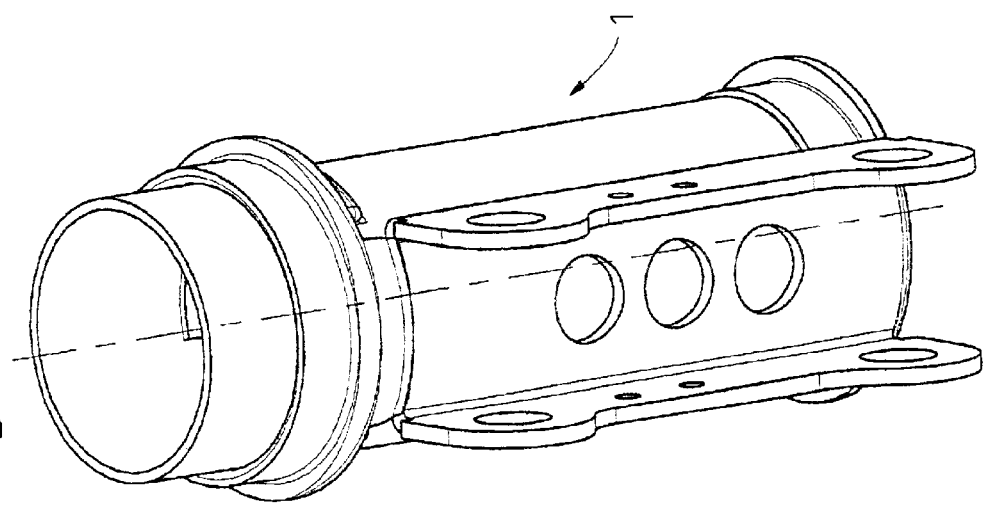

KNUCKLE BRACKET FOR A STRUT-TYPE SHOCK ABSORBER

BACKGROUND OF THE INVENTION

1. Field of the Invention

The invention pertains to a one-piece knuckle bracket formed as a bent-to-shape part including a pair of support bodies having axially aligned openings for receiving an outer casing of a shock absorber, a web connecting the support bodies, and a pair of tabs for fixing the shock absorber to a joint.

2. Description of the Related Art

U.S. Pat. No. 5,730,547 discloses a one-piece knuckle bracket, designed as a bent-to-shape part, comprising two support bodies a certain distance apart, each with an opening to receive an outer casing of a strut-type shock absorber, where a connecting web and tabs are provided between the support bodies for the attachment of the shock absorber to a joint.

The support bodies are blanked out at the ends of a flat piece of sheet metal and then bent into a knuckle bracket by several bending operations. The length of the sheet-metal blank consists of the length of the connecting web between the support bodies and a certain length for each of the tabs for connection to the joint. The width is composed of the distance between the tabs and their length.

DE 196 47 411 describes an attachment bracket for a vibration damper, which also is designed in the form of a one-piece, bent-to-shape part. In the case of the designs according to FIGS. 1–3, parallel slits are made in a flat sheet-metal blank to determine the shape of a shell part, made later. Then the sheet-metal blank is formed into a U-shaped bracket, which has a sleeve-like circumferential part. A collar is now formed on the edges of the circumferential part. The circumferential sections are extended to form transverse webs, so that the shell part has two layers over a certain distance and also projects radially outward to a certain extent. As a result, the shell part proceeding toward the center can have the same inside diameter as the circumferential part, which is now divided into two sections. As can be derived from this description, there is a certain complexity involved in producing this attachment bracket. Although the circumferential part is strengthened by the collar, a circumferential part of this type is not as strong as a support body according to U.S. Pat. No. 5,730,547.

SUMMARY OF THE INVENTION

The object of the present invention is to realize a knuckle bracket which guarantees a high degree of strength while requiring a minimum of simple forming steps.

According to the invention, the object is achieved by connecting and arranging the connecting web between the support bodies and the tabs for attachment to the joint with respect to each other to form a U-shape.

The essential advantage of the invention is that, first, an especially simple knuckle bracket is present, which, despite its simplicity, is still stronger than the indicated state of the art, because the connecting web carries the tabs. In addition, the receiving opening formed by the connecting web and the tabs arranged on it to form a U-shape is open at the axial ends, so that joints of different lengths can be accommodated.

In addition, the knuckle bracket can be produced from a comparatively smaller sheet-metal blank, because the length of the sheet-metal blank is determined by the outside diameter of the two support bodies and the length of the connecting web.

For knuckle brackets subjected to heavier loads, it can be provided that at least one of the support bodies is designed as a sleeve which proceeds from its attachment point to the connecting web toward the other support body. The sleeve and the connecting web thus form a section with two layers, which has a strength-increasing effect.

In another advantageous embodiment, the two support bodies are designed as sleeves which proceed from their attachment points toward the other support body in such a way that the opposing end surfaces of the support bodies are in contact with each other. When force is introduced into one of the support bodies, e.g., during the installation of the knuckle bracket onto the outer casing of a shock absorber, the support bodies are thus able to support each other.

It is also possible to weld the two support bodies to each other.

As an alternative or in combination, at least one of the sleeves proceeding in the direction of the other support body can be welded to the connecting web. Thus, the strength of the component can be increased, which is especially advisable in the case of very thin sheet metal.

So that the tabs can also be used to absorb relatively large axial forces, the tabs extend axially over the entire length of the connecting web.

So that the connecting web occupies the least possible amount of construction space, the connecting web has an arc-shaped cross-sectional form conforming to the external contour of the casing.

The knuckle bracket can be given additional support by allowing at least part of the length of the connecting web to rest against the casing.

A particular advantage can be achieved by welding the connecting web to the casing of the shock-absorber.

It has already been explained that the support body has a flange in order to avoid as far as possible the need to make a free punch between the sleeve of the support body and the connecting web. But to ensure good contact between the connecting web and the casing in spite of this, a transition arc proceeding toward the casing is provided between the support body and the connecting web to compensate for the radial projection of the rim of the support body beyond the casing.

As an alternative to a sleeve on the support body, it is also possible for the support body to be provided with at least one tongue-like attachment tab at the receiving opening, which tab is in working connection with the casing. Much less work is required to shape a tab of this type.

To ensure the best possible contact between the attachment tab and the casing of the piston-cylinder assembly, the attachment tab has an arc-shaped cross section, which conforms to the external contour of the casing.

For the sake of the effective attachment of the joint bracket to the casing, the receiving openings in the support bodies have different diameters, by which they rest against retaining surfaces of the casing. Because of the different diameters of the receiving openings, the casing can be designed with steps and thus provide at least one retaining surface for the joint bracket in the area of a step. A design of this type is of particular interest when the material of the casing or of the joint bracket is not very suitable for welding.

There is also the possibility, for example, that one of the radial surfaces of the support body can rest against a retaining surface of the casing.

Thus, for example, the end surface of the sleeve of the support body can rest against the support surface.

So that the difference between the diameters of the receiving openings can be compensated with minimal effort in terms of the connecting web, the connecting web is made with a larger pitch circle than the support body.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIGS. 2a–2d are views of a second embodiment;

FIGS. 3a–3d are views of a third embodiment;

FIGS. 4a–4d are views of a fourth embodiment;

FIGS. 6a–6d are views of a sixth embodiment of the knuckle joint, as fitted to a shock absorber casing;

FIGS. 7a and 7b are views of a seventh embodiment of the knuckle joint, as fitted to a specially formed shock absorber casing; and FIGS. 8a–8c are views of an eighth embodiment of the knuckle joint, as fitted to a specially formed shock absorber casing.

DETAILED DESCRIPTION OF THE PRESENTLY PREFERRED EMBODIMENTS

Figure 1C:
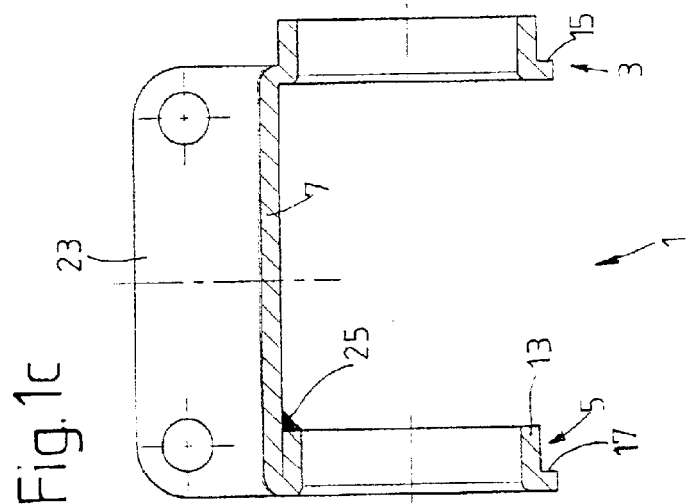
FIG. 1c is an axial section.
Figure 1B:
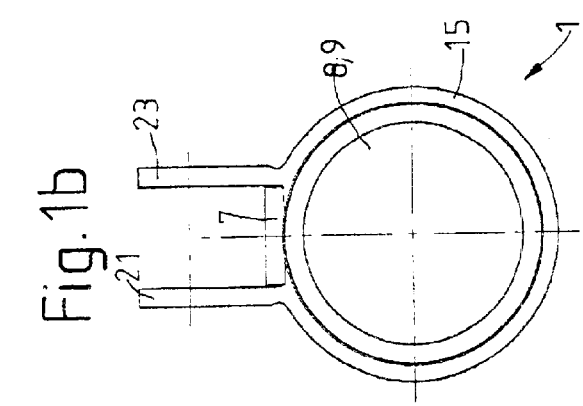
FIG. 1b is a top view.
Figure 1A:
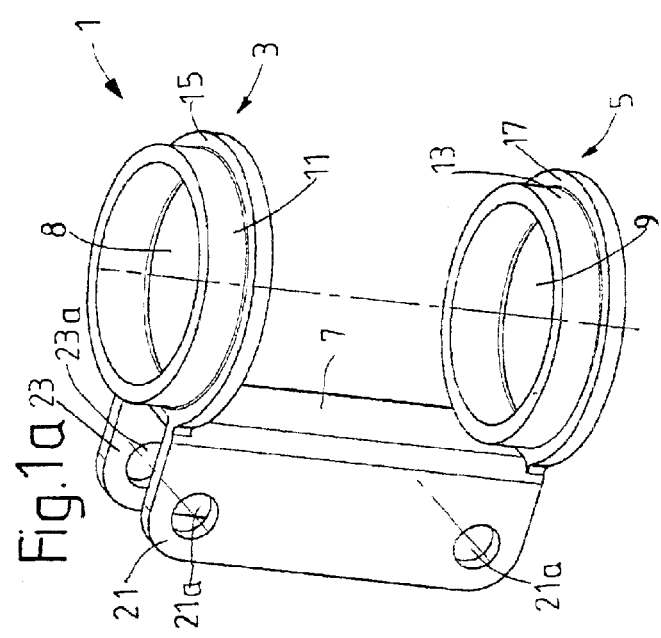
FIG. 1a is a perspective of a first embodiment of a knuckle bracket according to the invention.
Figure 1D:
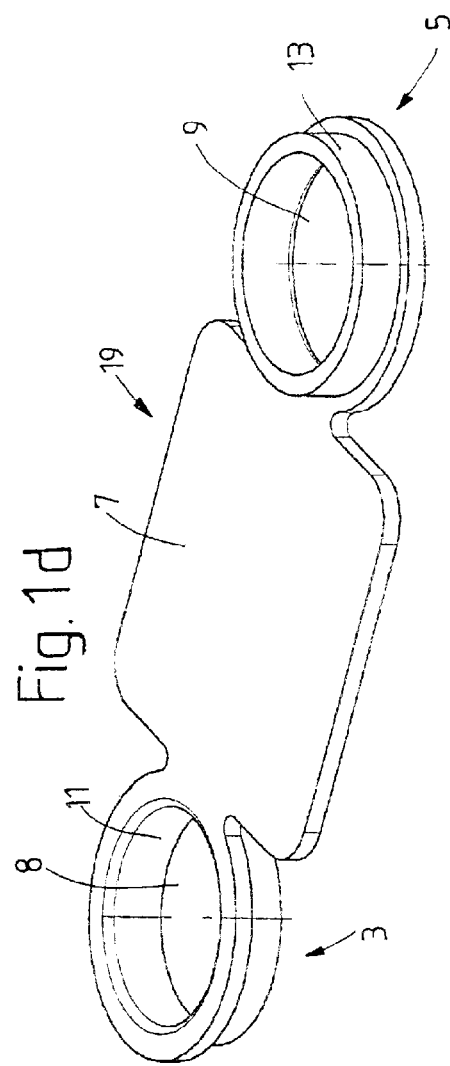
FIG. 1d is a perspective view of the knuckle bracket prior to bending to shape.
Figure 5C:
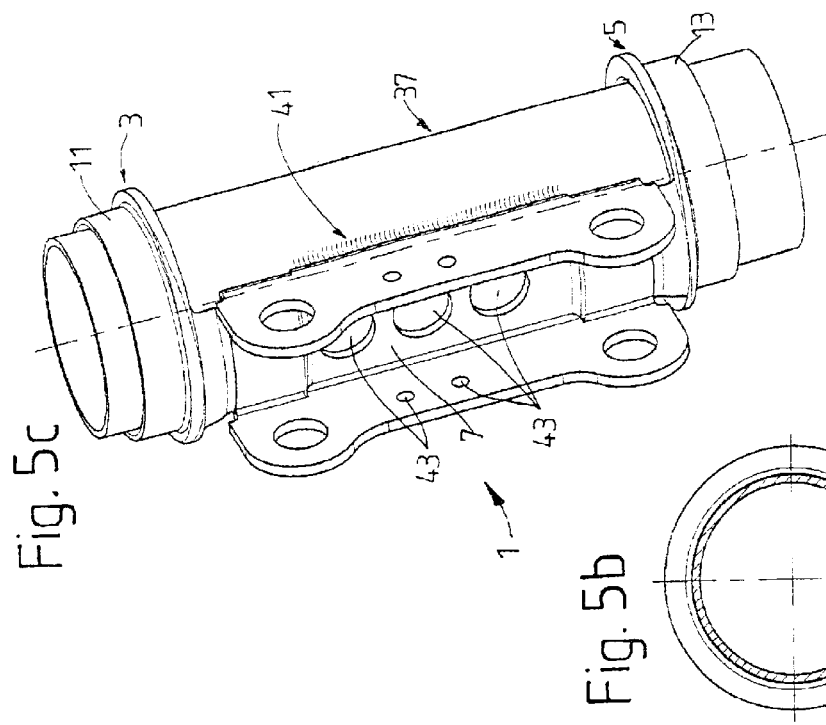
FIGS. 5a–5d are views of a fifth embodiment of the knuckle joint, as fitted to a shock absorber casing.
Figure 5B:
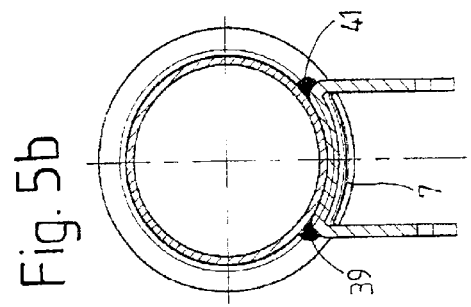
Figure 5D:
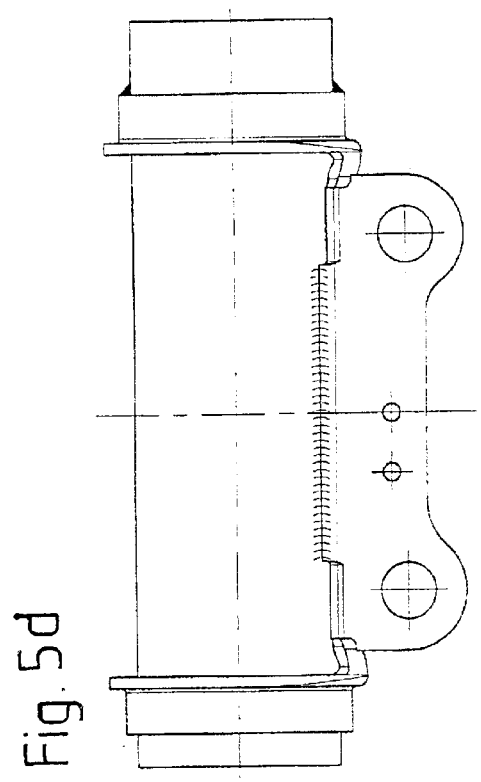
Figure 5A:
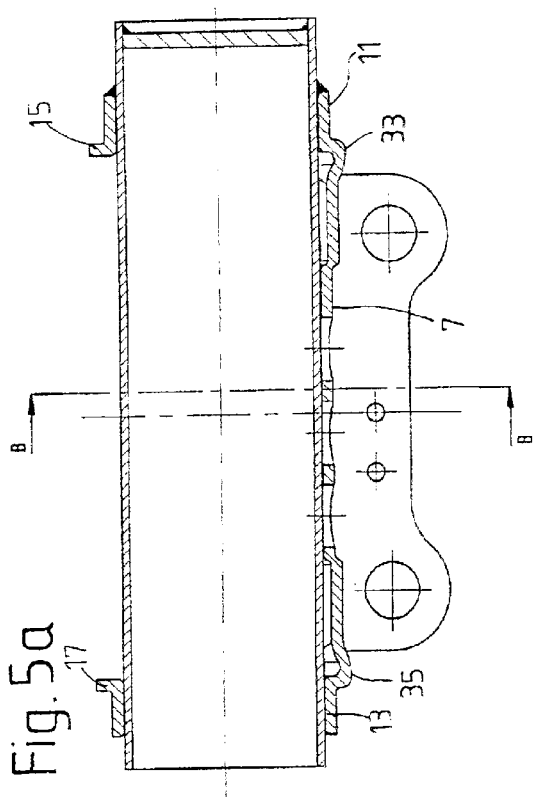

FIG. 1a shows a perspective view of a knuckle bracket 1, which has an upper support body 3 and, a certain distance away, a lower support body 5, a connecting web 7 is provided between the support bodies 3; 5. Each of the support bodies 3; 5 has a circular opening 8; 9 to hold the outer casing (not shown) of a shock absorber. Sleeves 11; 13 form the radial boundaries of the opening 8; 9, each sleeve 11; 13 being surrounded by a circumferential flange 15; 17, the thickness of which is approximately the same as that of the sheet-metal blank 19, as is clear from FIG. 1d.

The length of the sheet-metal blank 19 is determined by the diameters of the support bodies 3; 5 plus the length of the connecting web 7. The sheet-metal blank is produced in the first step of the process. So that the knuckle bracket can be attached to a joint, e.g., to a joint of a motor vehicle axle, it has two parallel tabs 21; 23, which, in the final assembled state, form a single unit with the connecting web 7 in the form of a U, each tab having a distal end remote from the web 7. The tabs 21; 23 extend over the entire length of the connecting web 7 in planes parallel to the axis of the openings 8. 9 and have transverse openings 21a; 23a to hold fastening means. Thus the width of the sheet-metal blank 19 consists of the width of the connecting web 7 plus the widths of the tabs 21; 23.

In the second step of the process, the openings 8; 9 for receiving the outer casing of the shock absorber are cut out, and the sleeves 11; 13 are formed. One of the sleeves 11 of the support bodies 3; 5 is drawn in one direction, starting from the plane of the sheet-metal blank 7, whereas the other sleeve 13 is drawn in the opposite direction.

At the end of the forming processes, the joint bracket 1 shown in FIG. 1c is present, in which the one support body 3 faces the other support body 5, and part of the connecting web 7 and the sleeve 13 are parallel to each other. As can be easily seen from this figure, the thickness of the flanges 15; 17 is approximately the same as that of the sheet-metal blank 19, which has the advantage that, after the forming process, the support bodies 3; 5 lie on a common axis and the amount of work required to shape the tabs 21; 23 and the connecting web 7 is as small as could be imagined. In addition, no free punches have to be made in the sheet-metal blank at the transitions between the connecting web 7 and the rims 15; 17 of the support bodies for the sake of bending the support bodies with respect to the connecting web.

To increase the strength of the overall knuckle bracket 1, the support body 5, the sleeve 13 of which is parallel to the connecting web 7, can also be joined by a weld 25 to the connecting web.

FIGS. 2a–2d show a modification of the embodiment of FIGS. 1a–1d in that the sleeves 11; 13 formed in the sheet-metal blank both proceed in the same direction and in the finished state represent mirror images of each other, extending axially outward beyond the connecting web 7. This variant is especially easy to fabricate.

FIGS. 3a–3d show that it can also be quite effective to have the two sleeves 11; 13 point toward each other in the axial direction. This results in an especially compact knuckle bracket 1, which can also be strengthened, if desired, by connecting the sleeves by welds 25 to the parallel connecting web 7.

FIGS. 4a–4d represent an elaboration of the embodiment of FIGS. 3a–3d. The lengths of the sleeves 11; 13 of the support bodies 3; 5 are calculated so that the end surfaces 27; 29 of the sleeves 11; 13 which are facing each other are in contact. The sleeves 11; 13 thus form a tubular body, the length of which is the same as that of the connecting web 7. By means of suitable welding operations, it is possible to join the sleeve bodies to each other and thus to obtain an extremely sturdy joint bracket. It is also possible to connect the sleeve bodies externally via an axially oriented weld 31 to the connecting web 7.

FIGS. 5a–5d show an elaboration of a joint bracket 1 of the design according to FIGS. 2a–2d. Starting from the flange 15; 17 of the support bodies 11; 13, transition arcs 33; 35 extend to compensate for the radial projection of the flange 15; 17 beyond the casing 37 of the shock absorber. These transition arcs ensure a favorable stress state within the knuckle bracket 1 and prevent the formation of cracks at this point. It is thus also possible for the connecting web 7 to rest against the casing. As can be seen from FIG. 5b, the connecting web has an arc-shaped cross-sectional form. Thus full surface-to-surface contact between the connecting web and the casing can be obtained.

The closest possible contact between the connecting web 7 and the casing 37 means that axially oriented welds 39; 41 can be made between the connecting web and the casing. If desired, openings 43 can be made in the connecting web and in the tabs to reduce the weight of the knuckle bracket.

The embodiment of FIGS. 6a–6d shows that the support bodies 11; 13 do not necessarily have to have sleeves 11; 13.

Thus, in the assembled state of the knuckle bracket according to FIG. 6d, we can see a tongue-like attachment tab 45 in the area of the receiving opening 9. In the finished knuckle bracket, this tab extends in the axial direction of the shock absorber and also has an arc-shaped cross-sectional form so that it can be welded very effectively to the casing 37. An attachment tab requires much less forming work, and the overall receiving opening which is cut out of the blank can also be divided into several attachment tabs.

The embodiment of FIGS. 7a and 7b is also based on the variant according to FIGS. 2a–2d but differs from it in particular in that the support bodies 3; 5 have different diameters and are supported axially on retaining surfaces 47; 49 on the casing 37. For this purpose, the casing is provided with steps. Thus the knuckle bracket 1 can be pushed axially onto the casing 37 of the piston-cylinder assembly and held in place in both directions by means of at least one radially outward-pressed retaining surface below the support body 5. This type of attachment is recommended when a difficult-to-weld material such as aluminum is used.

In FIGS. 8a–8c, a casing corresponding to FIGS. 1a–1d is used. In contrast, however, the support bodies 3; 5 also have different diameters, and the connecting web 7 is designed on a larger pitch circle than the support body 3, with the smaller diameter. The sleeve 13 is supported by its end surface 51 on the retaining surface 47 of the casing 37.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A combination of an outer casing of a shock absorber having a contour and a one-piece knuckle bracket formed from a sheet metal blank as a bent-to-shape part, said knuckle bracket comprising:

a pair of support bodies each having a circular receiving opening for receiving the outer casing of a shock absorber, said openings being axially aligned, a connecting web formed integrally with said support bodies and connecting said support bodies, said web being formed with an arc-shaped cross-sectional form which conforms substantially to the contour of the casing, at least part of said connecting web resting directly against the casing and being welded to the casing, and a pair of tabs for attaching the shock absorber to a joint, said tabs being formed integrally with said connecting web and extending transversely from said connecting web to form a U-shaped cross-section, each said tab having a free distal end remote from said web.

2. The combination of claim 1 wherein at least one of said support bodies is formed as a sleeve which is attached to said connecting web at an attachment point and extends from said attachment point toward the other support body.

3. The combination of claim 2 wherein both of said support bodies are formed as sleeves, said sleeves having respective end surfaces which contact each other.

4. The combination of claim 2 wherein said at least one support body is welded to said connecting web.

5. The combination of claim 1 wherein said tabs extend axially along the entire length of the connecting web.

6. The combination of claim 1 wherein each of said support bodies is formed as a sleeve having a circumferentially extending flange, said bracket further comprising a transition arc extending from each of said flanges radially inward to said connecting web.

7. The combination of claim 1 wherein one of said support bodies comprises a tab formed in said receiving opening for making a working connection with said casing of said shock absorber.

8. The combination of claim 7 wherein said tab has an arc-shaped cross-section so that it conforms to said casing.

9. The combination of claim 1 wherein said receiving openings have different diameters, said receiving openings being spaced to rest against stepped retaining surfaces on the casing.

10. The combination of claim 9 wherein at least one of said support bodies is formed with a circumferential flange having a radially oriented surface which rests against a stepped retaining surface on the casing.

11. The combination of claim 9 wherein at least one of said support bodies is formed as a sleeve having an end surface which rests against a stepped retaining surface on the casing.

12. The combination of claim 1 wherein said connecting web is formed on a circle having a larger pitch than the support bodies.

13. The combination of claim 1 wherein said support bodies are formed as sleeves.

14. The combination of claim 13 wherein each said sleeve is attached to said connecting web at an attachment point and extends from said attachment point away from the other support body.

15. The combination of claim 1 wherein said tabs lie in planes which extend substantially parallel to the axis of the openings.

* * * * *